US011917348B2

(12) United States Patent
Wen et al.

(10) Patent No.: US 11,917,348 B2
(45) Date of Patent: Feb. 27, 2024

(54) COVERING STRUCTURE, SOUND PRODUCING PACKAGE AND RELATED MANUFACTURING METHOD

(71) Applicant: XMEMS TAIWAN CO., LTD., Hsinchu County (TW)

(72) Inventors: Hai-Hung Wen, Hsinchu County (TW); Wei-Yang Li, Hsinchu County (TW)

(73) Assignee: XMEMS TAIWAN CO., LTD., Hsinchu County (TW)

( * ) Notice: Subject to any disclaimer, the term of this patent is extended or adjusted under 35 U.S.C. 154(b) by 86 days.

(21) Appl. No.: 17/736,108

(22) Filed: May 4, 2022

(65) Prior Publication Data

US 2022/0386000 A1 Dec. 1, 2022

Related U.S. Application Data

(60) Provisional application No. 63/195,702, filed on Jun. 1, 2021.

(51) Int. Cl.
*H04R 1/02* (2006.01)

(52) U.S. Cl.
CPC .................................... *H04R 1/021* (2013.01)

(58) Field of Classification Search
CPC ............. H04R 19/04; H04R 2201/003; H04R 19/005; H04R 1/083; H04R 1/2807; H04R 1/2838; H04R 1/2869; H04R 17/02; H04R 31/00; G10K 11/04; G10K 11/172; G10K 2210/3227
See application file for complete search history.

(56) References Cited

U.S. PATENT DOCUMENTS

| | | | |
|---|---|---|---|
| 7,260,230 B2 | 8/2007 | Feng | |
| 2021/0092500 A1 | 3/2021 | Lo | |
| 2023/0097657 A1* | 3/2023 | Bremer | G01F 1/662 73/861.27 |

FOREIGN PATENT DOCUMENTS

| | | | |
|---|---|---|---|
| JP | 2005-130437 A | | 5/2005 |
| KR | 20140121623 A | * | 10/2014 |
| KR | 101460205 B1 | * | 11/2014 |
| KR | 101691373 B1 | * | 1/2017 |
| KR | 10-2017-0057584 A | | 5/2017 |

(Continued)

OTHER PUBLICATIONS

Olson, Harry F. Elements of Acoustical Engineering. New York: D. Van Nostrand, 1940. pp. 49-100. (Year: 1940).*

(Continued)

*Primary Examiner* — Kile O Blair
(74) *Attorney, Agent, or Firm* — Winston Hsu

(57) ABSTRACT

A covering structure disposed within a sound producing package includes a first portion, a second portion and a third portion. The first portion is configured to form a first sound outlet having a first diameter. The second portion is configured to form a chamber having a second diameter. The third portion is configured to form a second sound outlet having a third diameter. Wherein, the first sound outlet, the chamber and the second sound outlet provide an acoustic pathway, the first diameter is smaller than the second diameter, and the third diameter is smaller than the second diameter; and wherein, the second portion is disposed between the first portion and the third portion.

18 Claims, 3 Drawing Sheets

(56) References Cited

FOREIGN PATENT DOCUMENTS

KR 10-2021-0035028 A 3/2021

OTHER PUBLICATIONS

Russell, Daniel A. "Acoustic High-Pass, Low-Pass, and Band-Stop Filters." Acoustic Filters Lab—California Institute of Technology, Science and Mathematics Department GMI Engineering & Management Institute, users.cms.caltech.edu/~ps/All.pdf. Accessed Sep. 24, 2023. (Year: 2023).*

* cited by examiner

COVERING STRUCTURE, SOUND PRODUCING PACKAGE AND RELATED MANUFACTURING METHOD

CROSS REFERENCE TO RELATED APPLICATIONS

This application claims the benefit of U.S. Provisional Application No. 63/195,702, filed on Jun. 1, 2021. The content of the application is incorporated herein by reference.

BACKGROUND OF THE INVENTION

1. Field of the Invention

The present invention relates to a covering structure of a sound producing package and the related manufacturing method, and more particularly, to a covering structure of a sound producing package and the related manufacturing method for suppressing high frequency acoustic waves.

2. Description of the Prior Art

Micro sound producing devices, such as micro electro mechanical system (MEMS) speakers, are developed rapidly and widely used in various electronic devices due to their small size. For example, an MEMS speaker may use a thin film piezoelectric material as an actuator and a thin single crystal silicon layer as a membrane which are formed by at least one semiconductor process.

Due to the small size and fragile structure of the MEMS speakers, a covering structure may be used to cover and protect the MEMS speaker. In general, the covering structure may be composed of a thin metal lid having a sound outlet as a pathway for propagating sounds. The acoustic wave generated by the MEMS speaker and received outside the sound outlet may usually have a large frequency response at higher frequencies, which may generate a higher total harmonic distortion (THD). The unwanted THD may degrade the sound quality and is requested to be canceled in audio applications. Thus, there is a need for improvement over the prior art.

SUMMARY OF THE INVENTION

It is therefore an objective of the present invention to provide a covering structure of a sound producing package and its related manufacturing method, so as to solve the abovementioned problem.

An embodiment of the present invention discloses a covering structure, which is disposed within a sound producing package. The covering structure comprises a first portion, a second portion and a third portion. The first portion is configured to forma first sound outlet having a first diameter. The second portion is configured to form a chamber having a second diameter. The third portion is configured to form a second sound outlet having a third diameter. Wherein, the first sound outlet, the chamber and the second sound outlet provide an acoustic pathway, the first diameter is smaller than the second diameter, and the third diameter is smaller than the second diameter; and wherein, the second portion is disposed between the first portion and the third portion.

Another embodiment of the present invention discloses a sound producing package, which comprises a sound producing device and a covering structure. The sound producing device is configured to produce an acoustic wave. The covering structure, configured to cover the sound producing device, comprises a first portion, a second portion and a third portion. The first portion is configured to form a first sound outlet having a first diameter. The second portion is configured to form a chamber having a second diameter. The third portion is configured to form a second sound outlet having a third diameter. Wherein, the first sound outlet, the chamber and the second sound outlet provide an acoustic pathway, the first diameter is smaller than the second diameter, and the third diameter is smaller than the second diameter; and wherein, the second portion is disposed between the first portion and the third portion.

Another embodiment of the present invention discloses a method of manufacturing a sound producing package. The method comprises steps of: forming a sound producing device, wherein the sound producing device is configured to produce an acoustic wave; and forming a covering structure to cover the sound producing device, wherein the covering structure comprises a first portion, a second portion and a third portion. The first portion is configured to form a first sound outlet having a first diameter. The second portion is configured to form a chamber having a second diameter. The third portion is configured to form a second sound outlet having a third diameter. Wherein, the first sound outlet, the chamber and the second sound outlet provide an acoustic pathway, the first diameter is smaller than the second diameter, and the third diameter is smaller than the second diameter; and wherein, the second portion is disposed between the first portion and the third portion.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
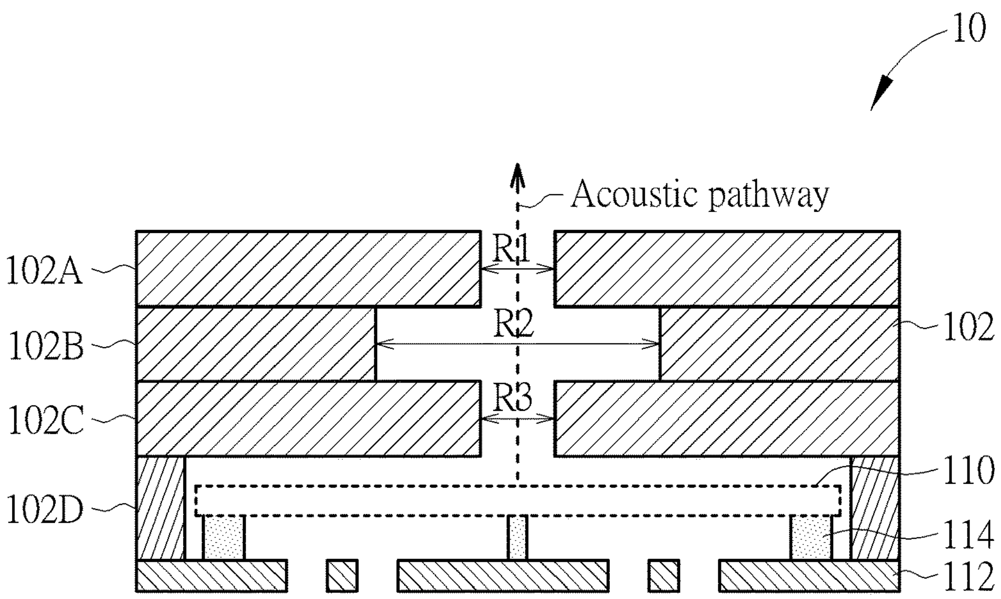
FIG. 1 is a schematic diagram of a sound producing package according to an embodiment of the present invention.

FIG. 1 is a schematic diagram of a sound producing package 10 according to an embodiment of the present invention, where a cross-sectional view of the sound producing package 10 is shown. As shown in FIG. 1, the sound producing package 10 includes a covering structure 102, which includes a first portion 102A, a second portion 102B, a third portion 102C, and a supporting frame 102D. The sound producing package 10 further includes a sound producing device (SPD) 110 and a substrate 112. The SPD 110, which may be a micro electro mechanical system (MEMS) speaker, may be attached to the substrate 112 through an attach material 114 such as a die attach film or epoxy paste. In an embodiment, the SPD 110 may include one or more membranes and corresponding actuators which are deployed as specified in U.S. Pat. No. 10,805,751 B1 and/or U.S. Pat. No. 11,057,716 B1, but is not limited thereto. The SPD 110 and the membranes included in the sound producing package 10 may compress air particles to generate sound waves, which are propagated through an acoustic pathway of the covering structure 102 to be delivered outwards.

In an embodiment, the first portion 102A, the second portion 102B and the third portion 102C of the covering structure 102 may be manufactured by using a molding compound (or be made of molding compound). The supporting frame 102D of the covering structure 102 may be attached to the substrate 112 through, for example, an epoxy paste, in the assembling process. The supporting frame 102D is configured to form a space for containing the SPD 110.

In the sound producing package 10, the covering structure 102 is deployed appropriately to form a chamber within the covering structure 102, so as to suppress/attenuate a high-frequency total harmonic distortion (THD) in the acoustic waves generated by the SPD 110. In detail, the first portion 102A of the covering structure 102 may be an upper layer, which has an upper sound outlet with a diameter R1. The third portion 102C of the covering structure 102 may be a lower layer, which has a lower sound outlet with a diameter R3. The second portion 102B of the covering structure 102 may be a middle layer deployed between the upper layer and the lower layer, where the middle layer has a chamber with a diameter R2. The upper sound outlet, the chamber and the lower sound outlet provide/form an acoustic pathway for passing the sounds generated by the SPD 110. The diameter R1 of the upper sound outlet and the diameter R3 of the lower sound outlet should be both smaller than the diameter R2 of the chamber, such that the chamber is formed.

Figure 2:
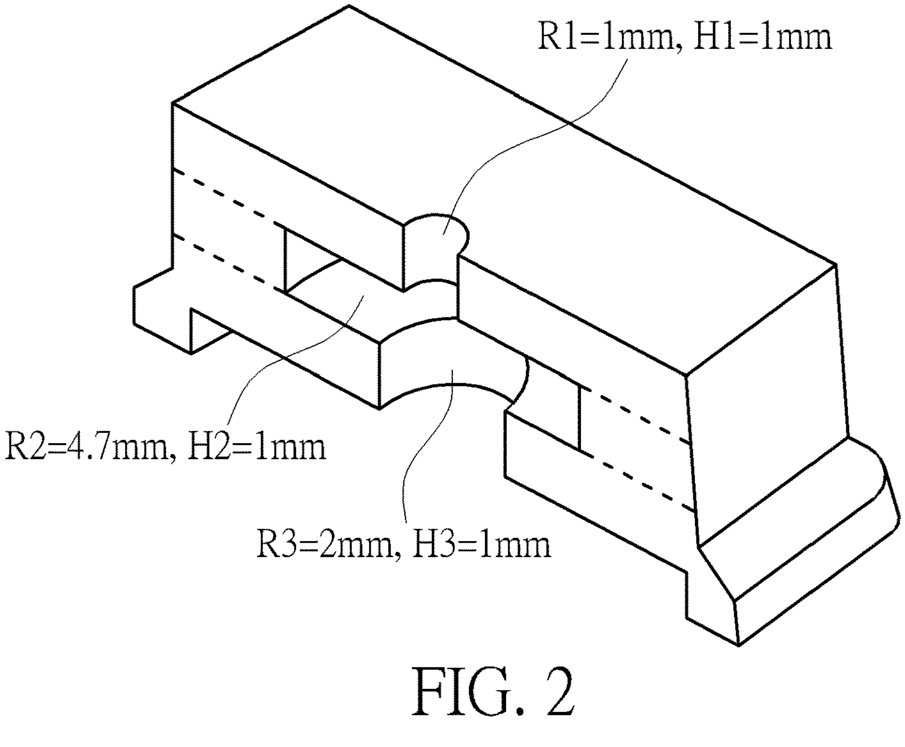
FIG. 2 illustrates a stereo sectional view of a covering structure.

FIG. 2 further illustrates a stereo sectional view of a covering structure such as the covering structure 102 shown in FIG. 1. In the exemplary embodiment shown in FIG. 2, the upper sound outlet of the first portion has a diameter R1 equal to 1 millimeter (mm) and a height H1 equal to 1 mm. The lower sound outlet of the third portion has a diameter R3 equal to 2 mm and a height H3 equal to 1 mm. The chamber between the upper/lower sound outlets has a diameter R2 equal to 4.7 mm and a height H2 equal to 1 mm. An SPD may be disposed in the space under the third portion.

Figure 3:
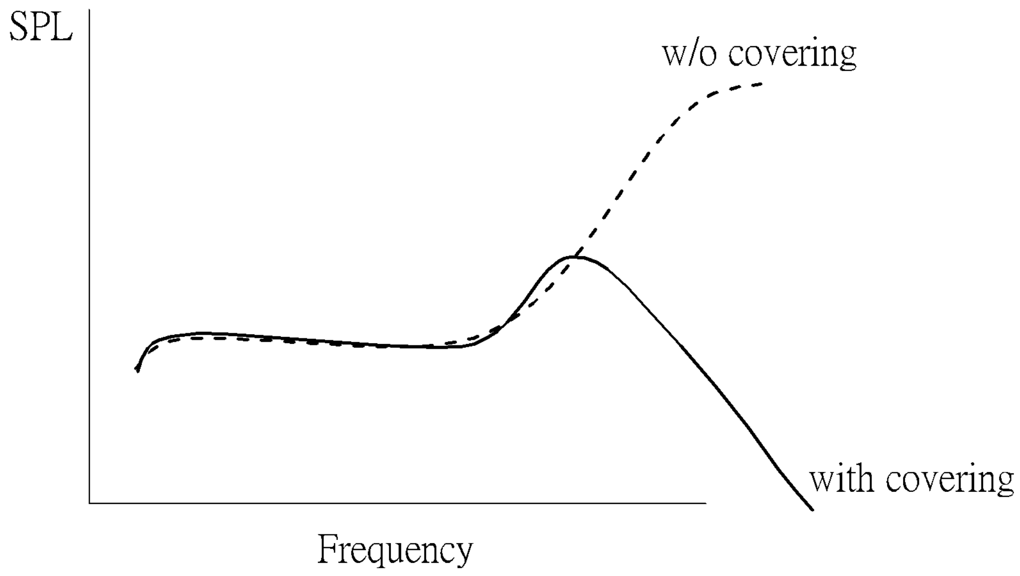
FIG. 3 is a waveform diagram of the measured sound pressure level (SPL) with respect to frequencies.

The deployment of the chamber in the covering structure may have an effect of filtering out high frequency components of the acoustic waves, exploiting the concept of muffler design disposed within, for example, an engine or a vehicle. FIG. 3 is a waveform diagram of the measured sound pressure level (SPL) with respect to frequencies, where the comparison of the SPL with the covering structure having the chamber and without the covering structure is illustrated. As shown in FIG. 3, if the SPD is measured without using any covering structure, the SPL measured outside the covering structure will increase sharply/rapidly at higher frequencies. The increasing SPL generates unwanted THD in higher frequencies due to characteristics of ear simulators. If the covering structure having the chamber on the acoustic pathway is applied (as the present invention), the SPL in higher frequencies will be suppressed and the detected frequency response outside the covering structure at the high-frequency range may be decreased. This is because, like muffler design, a standing wave (or standing waves) is formed within the chamber, where the standing wave may correspond to a peak transmission loss (TL) frequency. When the acoustic waves generated by the SPD greater than a specific frequency (the specific frequency herein may refer to the peak TL frequency) pass through the lower sound outlet and enter the chamber, they (some of the acoustic waves) may form standing waves in the chamber. Those standing/acoustic waves will mostly stay in the chamber and may hardly be propagated through the upper sound outlet to be detected outside. In such a situation, the high-frequency SPL measured outside the covering structure may be reduced, which thereby reduces the THD and improves the sound quality.

Note that, the acoustic pathway has a wider chamber between two narrower outlets, and the high-frequency response of the acoustic waves may be decreased since the high-frequency acoustic waves may be converted into (or in form of) standing waves to stay in the chamber. The deployments and related dimensions of the covering structure should not be limited herein. For example, in the embodiment as shown in FIG. 2, the diameter of the upper sound outlet is smaller than the diameter of the lower sound outlet. In another embodiment, the diameter of the upper sound outlet may be greater than the diameter of the lower sound outlet, or these two sound outlets may have the same size.

Figure 4:
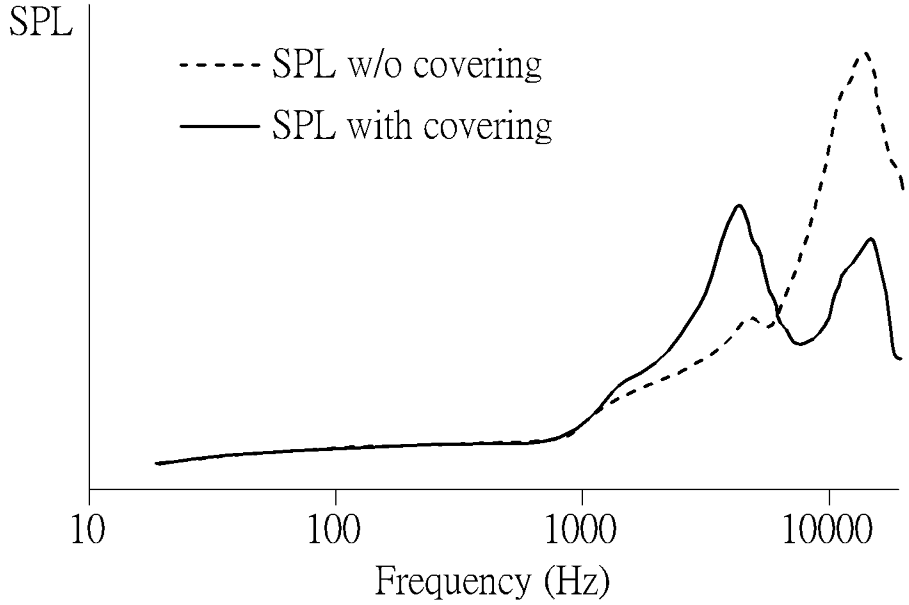
FIG. 4 is a waveform diagram illustrating a simulation result of the SPL.

FIG. 4 is a waveform diagram illustrating a simulation result of the SPL generated from the covering structure with the dimensions as shown in FIG. 2, where the SPL without a covering structure is also illustrated for comparison. As shown in FIG. 4, the SPL has a large peak at a higher frequency over 10 kilohertz (kHz). Since the SPL increases sharply over 10 kHz, the chamber of the covering structure may be configured to filter out the acoustic waves greater than 10 kHz, where the high-frequency acoustic waves greater than 10 kHz may form standing waves staying in the chamber.

The dimensions of the chamber and sound outlet of the covering structure may be configured to determine the features of suppressing the high-frequency acoustic waves. For example, a ratio of the diameter R2 relative to the diameter R1, denoted as R2/R1, may correspond to the SPL of the high-frequency acoustic waves (e.g., greater than 10 kHz) detected outside the covering structure. The larger or higher ratio R2/R1 may provide more suppression/attenuation on the high-frequency components of the acoustic waves. In addition, the frequency band suppressed or filtered out by the chamber of the covering structure may correspond to the height of the chamber (i.e., chamber height H2). Therefore, it is possible to well control the cutoff frequency of the filtering operations to realize the desired high-frequency filtering effects by adjusting the chamber height H2, where the covering structure may be considered as a low-pass filter capable of filtering out high-frequency signals. For example, if a user needs to increase the cutoff frequency of the filtering operation, a lower chamber height H2 may be disposed. In general, the audible band is between 20 Hz and 20 kHz, and thus the covering structure is preferably used to suppress the frequency band substantially between 10 kHz and 20 kHz.

Figure 5:
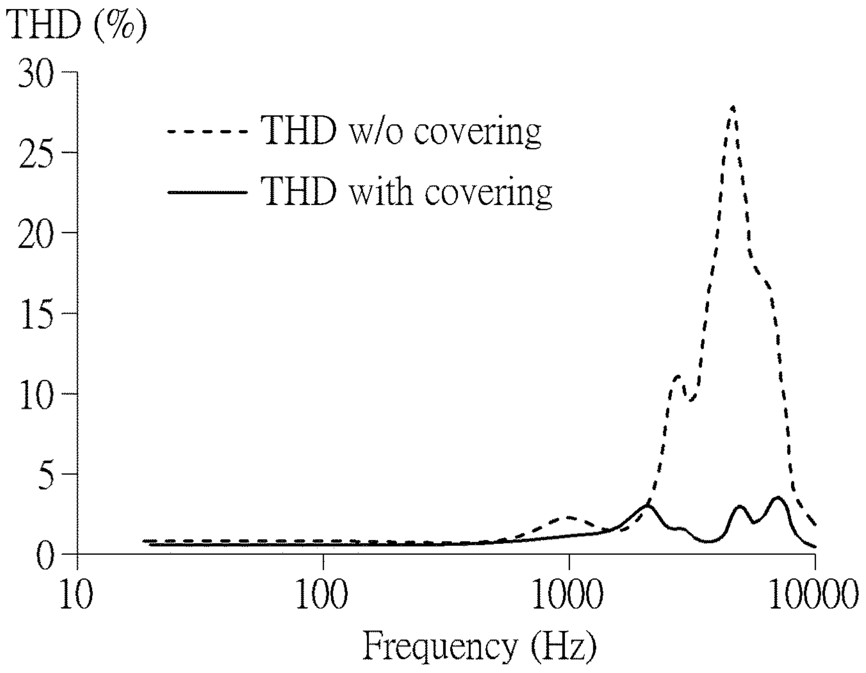
FIG. 5 further illustrates the total harmonic distortion corresponding to the SPL.

As shown in FIG. 4, the simulation result indicates that the maximum SPL is reduced by 17 dB at frequency 14.5 kHz. FIG. 5 further illustrates the THD corresponding to the SPL. As shown in FIG. 5, the THD reduces by 24% at frequency 4.75 kHz, and the THD peak reduces from 27% to 2.32%, which is a significant improvement provided by the chamber of the covering structure.

The peak TL frequency may be inversely proportional to the chamber height H2. As a result, the chamber height H2 increases as the peak TL frequency decreases. The chamber height H2 may be chosen such that the peak TL frequency (i.e., the specific frequency) is at least 10 kHz.

In addition, the ratio R2/R1 may be chosen such that a suppression of sound pressure level (SPL) at or above the specific frequency or at or above the peak TL frequency is at least 10 decibels (dB), where the suppression is relative to a scenario without covering structure having chamber formed therein.

Please note that the present invention aims at providing a covering structure of a sound producing package and its related manufacturing method. Those skilled in the art may make modifications and alterations accordingly. For example, the chamber design of the covering structure may be applied to any type of SPD that can be contained in a package. In the above embodiment as shown in FIG. 1, the sound producing package is a top firing package structure where the sound outlet is on the top of the package. In another embodiment, the present invention is applicable to a side firing package structure where the sound outlet is at a side (or sidewall) of the package.

Figure 6:
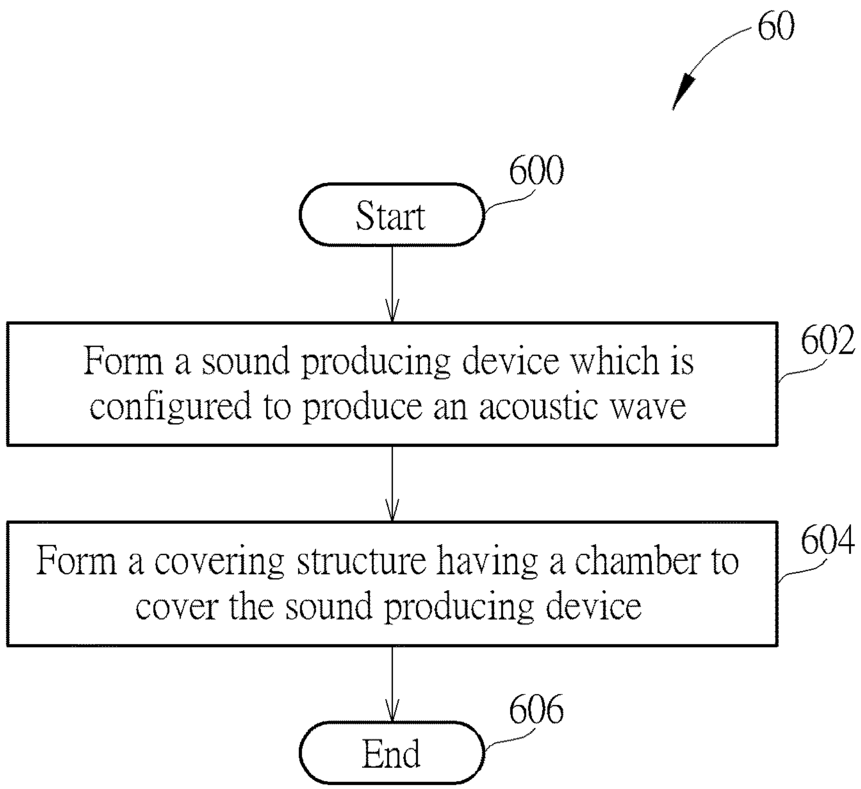
FIG. 6 is a flowchart of a process according to an embodiment of the present invention.

FIG. 6 is a flowchart of a process 60 according to an embodiment of the present invention. The process 60 may be implemented to manufacture a sound producing package such as the sound producing package 10 shown in FIG. 1. As shown in FIG. 6, the process 60 includes the following steps:

Step 600: Start.

Step 602: Form a sound producing device which is configured to produce an acoustic wave.

Step 604: Form a covering structure having a chamber to cover the sound producing device.

Step 606: End.

According to the process 60, the SPD may be formed on the substrate first, e.g., through a die attach film. Subsequently, the covering structure is formed on and attached to the substrate to cover the SPD. In Step 604, the portions 102A-102B may be manufactured in one piece. Or, since the covering structure includes a chamber, it is easier to manufacture each portion of the covering structure respectively and combine these portions through molding. For example, in the embodiment as shown in FIG. 1, the covering structure may be composed of three portions 102A-102C, and each portion has a layer including a hole with different diameters. The holes on different layers are aligned to generate the acoustic pathway. In the manufacturing process, the portion 102C (the lower layer) may be formed on the substrate 102 to be attached to the substrate 102 through the supporting frame 102D, the portion 102B (the middle layer) may then be formed on the portion 102C (e.g., by adhering), and the portion 102A (the upper layer) may then be formed on the portion 102B (e.g., by adhering).

In another embodiment, the covering structure may have more than three layers. A chamber may be generated if the holes on the upper/lower layers have smaller diameters and the hole(s) on the middle layer(s) have larger diameter(s). This covering structure may also be formed layer by layer through molding and/or adhering.

To sum up, the present invention provides a covering structure of a sound producing package and its related manufacturing method. The covering structure includes a chamber on the acoustic pathway. When the sounds generated by an SPD inside the covering structure pass through the acoustic pathway, the high-frequency acoustic waves (e.g., greater than 10 kHz) may be converted into standing waves to stay in the chamber. Therefore, the covering structure may operate as a low-pass filter, to suppress the high-frequency acoustic waves; hence, the SPL measured outside the covering structure will not increase sharply, so as to reduce the overall THD and improve the sound quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A covering structure, disposed within a sound producing package, the covering structure comprising:

a first portion, configured to form a first sound outlet having a first diameter;

a second portion, configured to form a chamber having a second diameter; and a third portion, configured to form a second sound outlet having a third diameter;

wherein the first sound outlet, the chamber and the second sound outlet provide an acoustic pathway, the first diameter is smaller than the second diameter, and the third diameter is smaller than the second diameter;

wherein the second portion is disposed between the first portion and the third portion;

wherein the sound producing package comprises a sound producing device configured to produce an acoustic wave;

wherein the acoustic wave propagates through the second sound outlet having the third diameter before the acoustic wave propagates through the first sound outlet having the first diameter which is smaller than the third diameter.

2. The covering structure of claim 1, wherein the first portion, the second portion and the third portion are made of a molding compound.

3. The covering structure of claim 1, wherein a standing wave is formed within the chamber.

4. The covering structure of claim 3, wherein the standing wave corresponds to a specific frequency greater than or equal to 10 kilohertz, and the specific frequency is a peak transmission loss frequency of the chamber.

5. The covering structure of claim 4, wherein a height of the chamber is chosen such that the specific frequency is greater than or equal to 10 kilohertz.

6. The covering structure of claim 4, wherein a ratio between the second diameter and the first diameter is chosen such that a suppression of sound pressure level (SPL) at the specific frequency is at least 10 decibels (dB);

wherein the suppression is relative to a scenario without covering structure having chamber formed therein.

7. A sound producing package, comprising:

a sound producing device, configured to produce an acoustic wave; and a covering structure, configured to cover the sound producing device, the covering structure comprising:

a first portion, configured to form a first sound outlet having a first diameter;

a second portion, configured to form a chamber having a second diameter; and a third portion, configured to form a second sound outlet having a third diameter;

wherein the first sound outlet, the chamber and the second sound outlet provide an acoustic pathway, the first diameter is smaller than the second diameter, and the third diameter is smaller than the second diameter;

wherein the second portion is disposed between the first portion and the third portion;

wherein the acoustic wave propagates through the second sound outlet having the third diameter before the acoustic wave propagates through the first sound outlet having the first diameter which is smaller than the third diameter.

8. The sound producing package of claim 7, wherein the first portion, the second portion and the third portion are made of a molding compound.

9. The sound producing package of claim 7, wherein a standing wave is formed within the chamber.

10. The sound producing package of claim 9, wherein the standing wave corresponds to a specific frequency greater than or equal to 10 kilohertz, and the specific frequency is a peak transmission loss frequency of the chamber.

11. The sound producing package of claim 10, wherein a height of the chamber is chosen such that the specific frequency is greater than or equal to 10 kilohertz.

12. The sound producing package of claim 10, wherein a ratio between the second diameter and the first diameter is chosen such that a suppression of sound pressure level (SPL) at the specific frequency is at least 10 decibels (dB);

wherein the suppression is relative to a scenario without covering structure having chamber formed therein.

13. A method of manufacturing a sound producing package, comprising:

forming a sound producing device, wherein the sound producing device is configured to produce an acoustic wave; and forming a covering structure to cover the sound producing device, wherein the covering structure comprises:

a first portion, configured to form a first sound outlet having a first diameter;

a second portion, configured to form a chamber having a second diameter; and a third portion, configured to form a second sound outlet having a third diameter;

wherein the first sound outlet, the chamber and the second sound outlet provide an acoustic pathway, the first diameter is smaller than the second diameter, and the third diameter is smaller than the second diameter;

wherein the second portion is disposed between the first portion and the third portion;

wherein the acoustic wave propagates through the second sound outlet having the third diameter before the acoustic wave propagates through the first sound outlet having the first diameter which is smaller than the third diameter.

14. The method of claim 13, further comprising:

making the first portion, the second portion and the third portion with a molding compound.

15. The method of claim 13, wherein a standing wave is formed within the chamber.

16. The method of claim 15, wherein the standing wave corresponds to a specific frequency greater than or equal to 10 kilohertz, and the specific frequency is a peak transmission loss frequency of the chamber.

17. The method of claim 16, wherein a height of the chamber is chosen such that the specific frequency is greater than or equal to 10 kilohertz.

18. The method of claim 16, wherein a ratio between the second diameter and the first diameter is chosen such that a suppression of sound pressure level (SPL) at the specific frequency is at least 10 decibels (dB);

wherein the suppression is relative to a scenario without covering structure having chamber formed therein.

* * * * *